United States Patent
Yun et al.

(10) Patent No.: US 7,424,013 B1
(45) Date of Patent: Sep. 9, 2008

(54) SYSTEM AND METHOD FOR GRANTING ARBITRATED BIDS IN THE SWITCHING OF INFORMATION

(75) Inventors: Kenneth Yi Yun, San Diego, CA (US); Kevin Warren James, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1905 days.

(21) Appl. No.: 10/029,581

(22) Filed: Dec. 20, 2001

(51) Int. Cl.
*H04L 12/66* (2006.01)
*H04L 12/28* (2006.01)

(52) U.S. Cl. ...................... 370/389; 370/351
(58) Field of Classification Search ............... 370/389, 370/351–356, 400, 401–403, 399, 395, 428, 370/412–418, 430, 422, 410, 462
See application file for complete search history.

(56) References Cited

U.S. PATENT DOCUMENTS

| | | | |
|---|---|---|---|
| 5,422,881 A * | 6/1995 | May et al. ................ 370/392 |
| 6,073,199 A | 6/2000 | Cohen et al. ............... 710/113 |
| 6,275,491 B1 | 8/2001 | Prasad et al. .............. 370/389 |
| 6,285,679 B1 | 9/2001 | Dally et al. ................ 370/413 |
| 7,072,295 B1 * | 7/2006 | Benson et al. ............. 370/230 |
| 2006/0274656 A1 * | 12/2006 | Paul et al. ................. 370/231 |

* cited by examiner

*Primary Examiner*—Ajit Patel
(74) *Attorney, Agent, or Firm*—Law Office of Gerald Maliszewski; Gerald Maliszewski

(57) ABSTRACT

A system and method are provided for fairly distributing grants for access to switch outputs, through crossbars, between switch input channels. Crossbars are granted access between specified switch inputs and switch outputs, and the least recently used input channels are associated with selected switch outputs. A history of the previous channel transaction is maintained for each switch output, and channels are nominated in a rotation through a priority channel list. The present invention bid grant algorithm permits information packets to be transferred across a switch in the time between a bid submission and a bid grant.

28 Claims, 6 Drawing Sheets

SYSTEM AND METHOD FOR GRANTING ARBITRATED BIDS IN THE SWITCHING OF INFORMATION

BACKGROUND OF THE INVENTION

1. Field of the Invention

This invention relates generally to information switching and, more particularly, to a system and method to efficiently and fairly distribute bids for access to switch outputs from a field of input channels.

2. Description of the Related Art

As noted in U.S. Pat. No. 6,285,679 (Dally et al.), data communication between computer systems for applications such as web browsing, electronic mail, file transfer, and electronic commerce is often performed using a family of protocols known as IP (internet protocol) or sometimes TCP/IP. As applications that use extensive data communication become more popular, the traffic demands on the backbone IP network are increasing exponentially. It is expected that IP routers with several hundred ports operating with aggregate bandwidth of Terabits per second will be needed over the next few years to sustain growth in backbone demand.

The network is made up of links and routers. In the network backbone, the links are usually fiber optic communication channels operating using the SONET (synchronous optical network) protocol. SONET links operate at a variety of data rates ranging from OC-3 (155 Mb/s) to OC-192 (9.9 Gb/s). These links, sometimes called trunks, move data from one point to another, often over considerable distances.

Routers connect a group of links together and perform two functions: forwarding and routing. A data packet arriving on one link of a router is forwarded by sending it out on a different link depending on its eventual destination and the state of the output links. To compute the output link for a given packet, the router participates in a routing protocol where all of the routers on the Internet exchange information about the connectivity of the network and compute routing tables based on this information.

Most prior art Internet routers are based on a common bus or a crossbar switch. In the bus-based switch of a SONET link, a line-interface module extracts the packets from the incoming SONET stream. For each incoming packet, the line interface reads the packet header, and using this information, determines the output port (or ports) to which the packet is to be forwarded. To forward the packet, the line interface module arbitrates for the common bus. When the bus is granted, the packet is transmitted over the bus to the output line interface module. The module subsequently transmits the packet on an outgoing SONET link to the next hop on the route to its destination.

Bus-based routers have limited bandwidth and scalability. The central bus becomes a bottleneck through which all traffic must flow. A very fast bus, for example, operates a 128-bit wide datapath at 50 MHz giving an aggregate bandwidth of 6.4 Gb/s, far short of the Terabits per second needed by a backbone switch. Also, the fan-out limitations of the bus interfaces limit the number of ports on a bus-based switch to typically no more than 32.

The bandwidth limitation of a bus may be overcome by using a crossbar switch. For N line interfaces, the switch contains N(N−1) crosspoints. Each line interface can select any of the other line interfaces as its input by connecting the two lines that meet at the appropriate crosspoint. To forward a packet with this organization, a line interface arbitrates for the required output line interface. When the request is granted, the appropriate crosspoint is closed and data is transmitted from the input module to the output module. Because the crossbar can simultaneously connect many inputs to many outputs, this organization provides many times the bandwidth of a bus-based switch.

Despite their increased bandwidth, crossbar-based routers still lack the scalability and bandwidth needed for an IP backbone router. The fan-out and fan-in required by the crossbar connection, where every input is connected to every output, limits the number of ports to typically no more than 32. This limited scalability also results in limited bandwidth. For example, a state-of-the-art crossbar might operate 32 different 32-bit channels simultaneously at 200 MHz giving a peak bandwidth of 200 Gb/s. This is still short of the bandwidth demanded by a backbone IP router.

FIG. 1 is a schematic block diagram illustrating a conventional packet switch (prior art). As noted in U.S. Pat. No. 6,275,491 (Prasad et al.), the architecture of conventional fast packet switches may be considered, at a high level, as a number of inter-communicating processing blocks. In this switch, ports $P_0$ through $P_n$ are in communication with various nodes, which may be computers or other switches (not shown). Each of the ports receives data over an incoming link, and transmits data over an outgoing link. Each of the ports is coupled to switch fabric F, which effects the routing of a message from the one of input ports, to the one of n output ports associated with the downstream node on the path to the destination of the packet. The switch has sufficient capability to divide the packet into slices (when on the input end) and to reconstruct slices into a packet (when on the output end). Arbiter A is provided to control the queuing of packets into and out of switch fabric F, and to control the routing operation of switch fabric F accordingly.

While the high-level architecture of fast packet switches may be substantially common, different architectural approaches are used in the implementation of the fast packet switch. These approaches determine the location (input, output, or both) and depth of cell queues or buffers, and also the type of routing used within switch fabric. For example, one architecture may operate by the input ports forwarding each received cell immediately to switch fabric F, which transfers cells at its input interfaces to its output interfaces in a time-division multiplexed fashion; on the output side, each cell that is output from switch fabric F is appended to a FIFO queue at its addressed output port. Another architecture may utilize input queues at the input ports, with arbiter A controlling the order in which cells are applied from the input queues to switch fabric F, which operates in a crossbar mode. Another architecture may utilize both input and output queues at the input ports, with switch fabric F and arbiter A operating as a multistage interconnection network. These and other various architectures are known in the field of fast packet switching.

Also as is well known in the art, actual communication traffic is neither uniform nor independent; instead, real traffic is relatively bursty, particularly in the communication of data and compressed video. As such, traffic management algorithms are often utilized in fast packet switching to manage the operation of the switch and to optimize switch performance. Examples of well-known traffic management algorithms include traffic shaping, flow control, and scheduling.

As noted in U.S. Pat. No. 6,073,199 (Cohen et al.), arbiters are used in computer systems to control access to a common bus used by multiple devices. Arbiters typically use arbitration schemes such as fixed priority, round robin, or rotating priority. A fixed priority algorithm assigns a priority to each device on the bus and grants usage based upon the relative priority of the devices making the requests. The round robin scheme has a fixed order and grants bus usage based upon the requestor order and the current user of the bus. The rotating priority scheme changes the priority of requesters based on a fixed algorithm. A deficit round robin algorithm is essentially the combination of the round robin algorithm with a system that gives an advantage or "credit" to an entity denied a grant. Conventionally, the fairness inherent in the DRR process is offset by the sequential steps required for implementation.

The goal of all arbitration schemes is to insure fair access to the shared resource, and to efficiently grant the resource to the correct requester. The fixed priority scheme is unfair because a high priority requestor can consume all the shared resource, starving the lower priority requesters. The round robin scheme is inefficient because multiple clocks may be required to determine which requestor should be granted the resource. Also round robin schemes have a fixed grant pattern that can result in starvation of particular requestors if request patterns match the round robin grant pattern. Rotating priority schemes are random in their efficiency and fairness based on the algorithm chosen to update device priority.

It would be advantageous if information packets could be transferred in a fair and efficient manner in the time it takes to make a decision on a bid submission.

It would be advantageous if bid grants for access to switch outputs could be fairly distributed between the channels in the switch inputs, and multiple switch crossbars.

It would be advantageous in promoting fairness if access to a switch output through a specified crossbar could be granted to the least recently used switch input channel.

It would be advantageous if the selection of the least recently used switch input channels could be made simultaneously to promote a faster arbitration process.

It would be advantageous if the least recently used channel could be selected in a plurality of arbitration cycles to maximize the number of crossbar/channel associations, increasing the overall efficiency in the transfer of information.

SUMMARY OF THE INVENTION

Conventional switches often perform bid submissions so that input port channels can gain access to an output port through a specified crossbar. The algorithms for selecting a crossbar are many and varied. The time between bid submission and the bid grant can be significant. If the switch acts to transfer information packets without the benefit of the bid grant, the crossbar selection algorithm is thwarted. If the switch transfers no information packets from the channels submitting the bids, then valuable processing time is lost, as the switch is inefficient. The present invention algorithm is able to process information packets from bid submitting channels, even as the channels are waiting to receive their bid grants, so that a minimum of processing time is lost.

Accordingly, a method is provided for distributing bid grants for access to switch outputs in the transfer of information across a switch. The method comprises: accepting information packets addressing a plurality of switch outputs; channeling the information packets into a plurality of channels; in response to the switch inputs submitting bids, receiving bid grants accessing switch outputs, for selected switch inputs (not all the switch inputs submitting bids are selected); and, for each selected switch input, selecting channels to accept the bid grants. Selecting channels to accept the bid grants includes: determining the available channels, with information packet addresses matching the bid grant switch outputs; and, distributing bid grants in response to the available channels. The distribution algorithm is described below.

The method further comprises: supplying a first plurality of switch crossbars to transfer information packets to switch outputs; and, supplying a bid grant for each crossbar, to access each switch output. Therefore, bid grants are received accessing specified switch outputs, through specified crossbars. Once a selected switch input receives a bid grant to a switch output through a specified crossbar, the least recently used available channel is selected for the specified switch output.

Other details of the above-described method for granting bids, and a system for granting bids in the distribution of information across a switch are provided below.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a device. These descriptions and representations are the means used by those skilled in the data processing arts to most effectively convey the substance of their work to others skilled in the art. A procedure, microprocessor executed step, data item, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a switch. It has proven convenient at times, principally for reasons of common usage, to refer to these signals as bits, values, elements, symbols, characters, terms, data items, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution. Further, a software application can perform switching and arbitrating functions.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "determining" or "recognizing" or "comparing" or "addressing" or "retrieving" or the like, refer to the action and operations of in a system that manipulates and transforms data represented as physical (electronic) quantities within the computer system's registers and memories into other data similarly represented as physical quantities within the switch, or switch peripherals.

Figure 1:
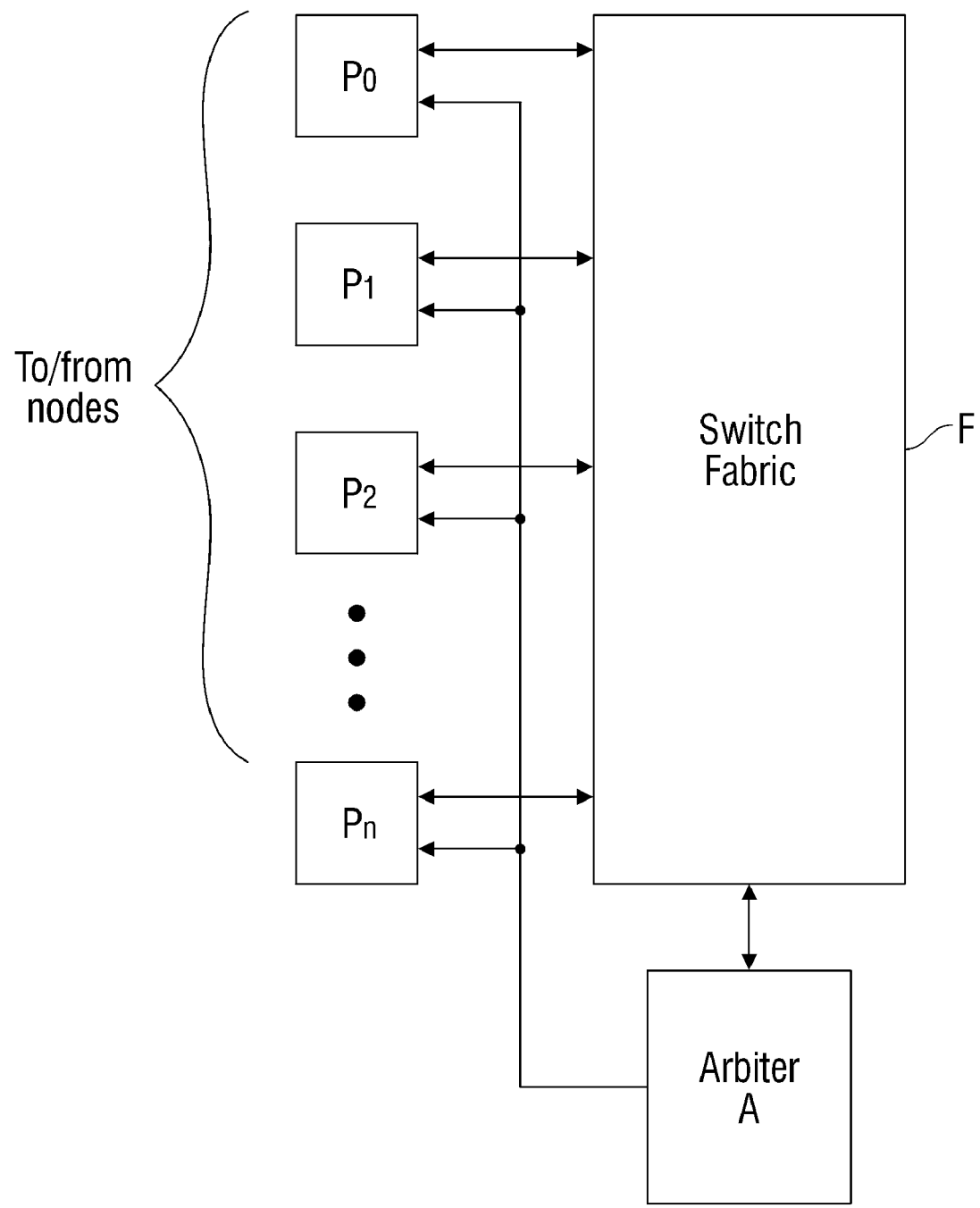
FIG. 1 is a schematic block diagram illustrating a conventional packet switch (prior art).
Figure 2:
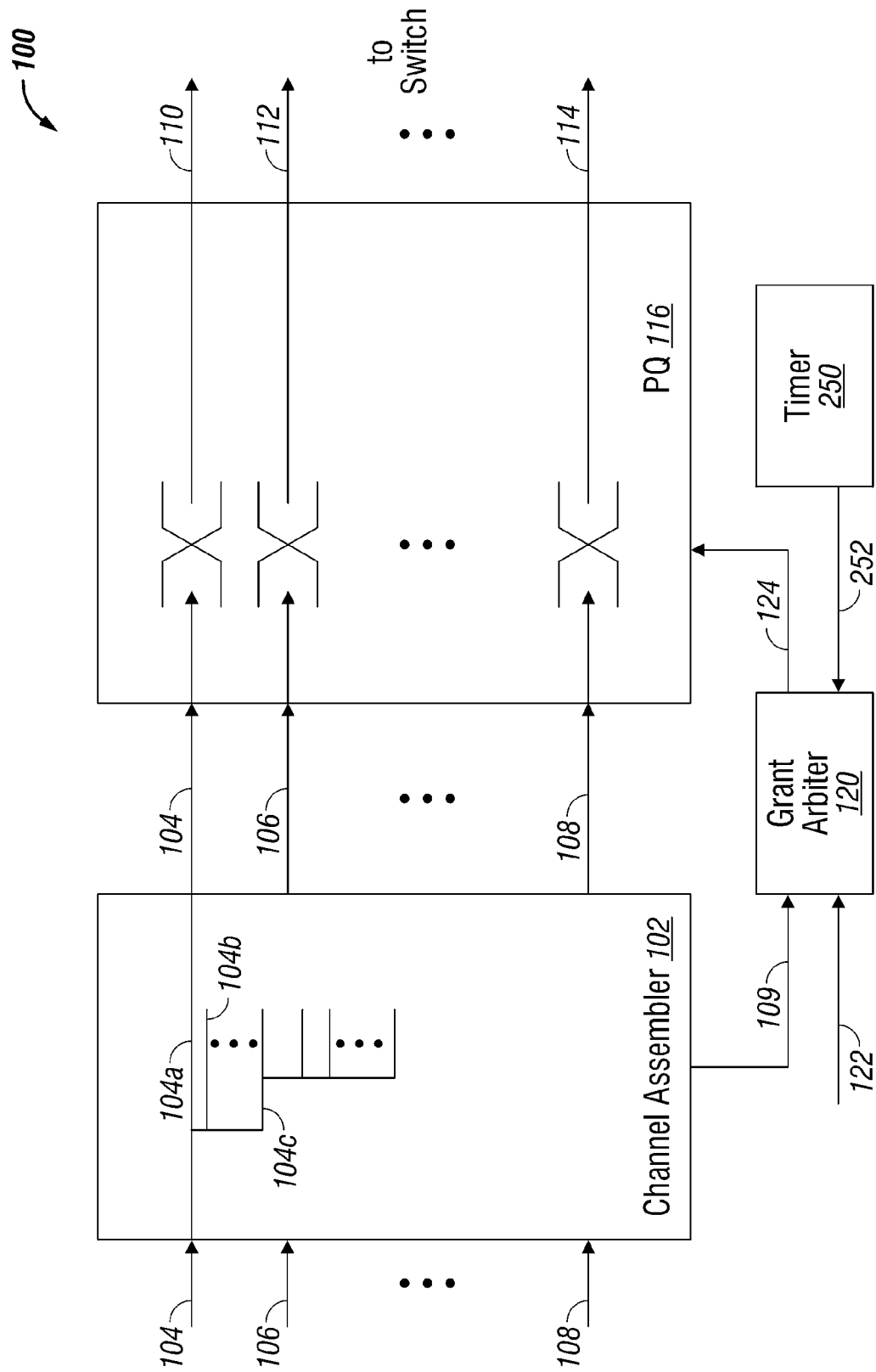
FIG. 2 is a schematic block diagram illustrating a system for distributing switch output bid grants in the transfer of information across a switch.

FIG. 2 is a schematic block diagram illustrating a system for distributing switch output bid grants in the transfer of information across a switch. The system 100 comprises a channel assembler 102 having a plurality of inputs, where each input accepts information packets addressing a plurality of switch outputs. A first input is shown on line 104, a second input on line 106, and an nth input on line 108. The present invention is not limited to any particular number of inputs. That is, the dots between lines 106 and 108 are intended to represent the potential of any number of additional inputs. The channel assembler 102 channels the information packets received at each input into a plurality of channels. As shown, the first input on line 104 is channeled into a first channel on line 104a, a second channel on 104b, and a jth channel on line 104c. Again, the dots between lines 104b and 104c are intended to represent the potential of additional channels. The present invention is not limited to any particular number of channels, even one and two channel assemblers can also be realized. The assignment of information packets to channels may be arbitrary, based on deadlines, class of service, or other criteria.

The channel assembler 102 supplies the channelized information packets at a plurality of outputs. As shown, the channel assembler 102 has a first output on line 104, a second output on line 106, and an nth output on line 108. Typically, the number of channel assembler outputs equals the number of channel assembler inputs, although each output includes a plurality of channels. For simplicity, the channel assembler outputs are shown as a single line. The channel arbiter 102 also has a channel status output on line 109 to communicate the contents of the channel assembler channels and queues. Thus, the grant assembler can determine the information packet switch output addresses in each channel, in each channel assembler output.

In a sense, each input and corresponding output of the channel assembler may be considered a switch input, where a channeling operation has been performed. Therefore, although lines 104, 106, and 108 are switch inputs, as used herein they will be differentiated as channel assembler inputs and channel assembler outputs.

A priority queue (PQ) unit 116 connects the channel assembler output lines 104, 106, and 108 to a switch (not shown, see FIG. 3) on lines 110, 112, and 114. The PQ unit 116 also has an input on line 118 to receive commands for connecting selected channels in each channel assembler output to the switch input. In a separate switch arbitration process, decisions are made to connect specified switch inputs to specified switch outputs, through specified crossbars. Once a switch input, switch output, and crossbar are known, a channel in the specified switch input must be selected. The PQ unit 116 enables the connection of specified switch input channels to specified switch outputs. This invention describes the system for selecting the channels.

A grant arbiter 120 has an input connected to the channel status output of the channel assembler 102 on line 109. The grant arbiter 120 has an input on line 122 to receive bid grants to access switch outputs, for selected channel assembler outputs. In response to the bid grant inputs, the grant arbiter 120 selects the channels that accept bid grants in each selected channel assembler output. The channel selection commands are output to the PQ unit 116 on line 124.

The grant arbiter 120 determines the number of available channels in each selected channel assembler output, where an available channel is defined herein as a channel with information packet addresses matching the bid grant switch outputs. The grant arbiter distributes bid grants in response to the number of available channels.

Generally, the grant arbiter 120 can accept up to a first plurality of bid grants accessing each switch output (switch output address) for distribution across each of the channel assembler outputs. For example, if the switch includes three crossbars, then the grant arbiter 120 receives three bid grants to use the first switch output. This distribution of the bid grants is made across the entire field of channel assembler outputs (as shown, three outputs). However, any one channel assembler output can receive up to a first plurality (in this example, three) of bid grants accessing a particular switch output (in this example, the first switch output). At each selected channel assembler output, the grant arbiter 120 determines the number of available channels, and distributes bid grants in response to the number of available channels. The distribution can be made randomly, or based on a predetermined patterns. Typically however, the present invention uses a fair, or even distribution process.

Figure 3:
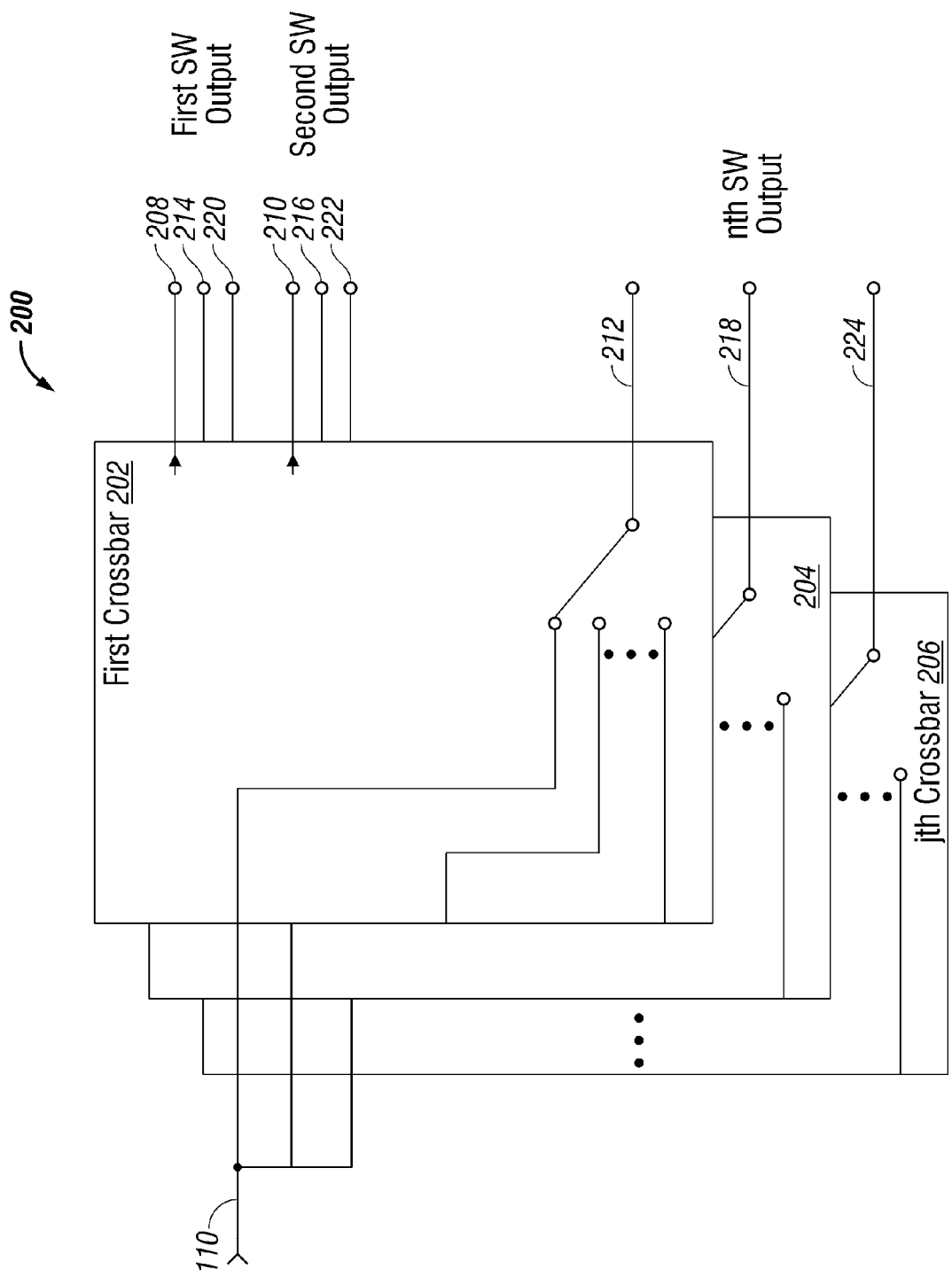
FIG. 3 is a schematic block diagram illustrating a switch including a first plurality of crossbars, each with a plurality of parallel routed switch inputs and a plurality of parallel routed switch outputs to transfer information packets to the switch outputs.

FIG. 3 is a schematic block diagram illustrating a switch 200 including a first plurality of crossbars, each with a plurality of parallel routed switch inputs and a plurality of parallel routed switch outputs to transfer information packets to the switch outputs. Multiple accesses can be granted to each switch output because of the existence the crossbars, or a parallel switching networks. A first crossbar 202, second crossbar 204, and a jth crossbar 206 are shown, but the invention is not limited to any particular number of crossbars.

Each crossbar is a parallel connection path to link a switch input to a switch output. For example, the first crossbar 202 has a first output on line 208, a second output on line 210, and an nth output on line 212. Likewise, the second crossbar 204 has a first output on line 214, a second output on line 216, and an nth output on line 218. The jth crossbar 206 has a first output on line 220, a second output on line 222, and an nth output on line 224. As is most clearly seen in the first crossbar 202, each crossbar output can potentially connect to any of the crossbar inputs. As shown, output n on line 212 is connected to any of the three crossbar inputs in response to selection commands.

In a simple scenario, each channel is permanently assigned to a particular crossbar. For example, the first channel of every channel assembler output receives bid grants for output links through the first crossbar 202 and the second channel receives bid grants for outputs through second crossbar 204. However, the most fair and efficient communication is promoted if constant reevaluations are made of which channels are to be associated with each crossbar. Even when the number of available channels (per switch input) does not equal the number of crossbars, fair and efficient communications are promoted by adaptive analysis.

A similar fair evaluation process is associated with the submission of bids from the inputs for access to switch outputs. There, decisions are made as to which channels should be matched to crossbars for the purposes of requesting access to a specific output. If the arbitration process were instantaneous, or occurring every decision cycle, the bid granting process of the present invention would be largely unnecessary. However, the response to the bid submission process may occur after the information packets used to formulate the bid have already been transferred. Instead of just assigning the bids to the channel/crossbar matches that were determined at the time of submission, the present invention is based upon the realization that fair and even distribution is further promoted by reevaluating the channels/crossbar matches at the time of the bid granting.

The grant arbiter 120 (FIG. 2) accepts a bid grant for each crossbar to access to each switch output. That is, the grant arbiter 120 maximally accepts up to a first plurality (j) of grants for an output, one in each crossbar. When the switch 200 has a second plurality (n) of outputs, the channel assembler typically has a second plurality of inputs, where each input accepts information packets addressing up to the second plurality of outputs. It should be understood that a switch arbiter (not shown) typically accepts bids from every switch input for each crossbar output. However, only one switch input can be linked to a switch output through a crossbar. The present invention selects the channel that will be associated with each bid grant.

Returning to FIG. 2, the channel assembler 102 channels information packets into a third plurality of channels per channel assembler input. In one example, the number of channels in each input is equal to the number of crossbars (j), and the channel assembler 102 accepts information packets addressing up to the second plurality (n) of switch outputs. In addition, the channel assembler 102 queues information packets by switch output, in up to a second plurality (n) of queues per channel. As shown, the jth channel of the first channel assembler input on line 104*c* has a first queue on line 104*c*1 for information packets addressed to the first switch output, a second queue on line 104*c*2 for information packets addressed to the second switch output, and a nth queue on line 104*c*3 for information packets addressed to the nth switch output. Again, the invention is not limited to any particular number of queues but, typically, the number of queues equals the number of switch outputs. Although not shown, each of the channels of the first channel assembler output includes n queues. Further, all the channels in each of the other channel assembler outputs also include a set of n queues, sorted by information packets addresses (switch outputs).

The grant arbiter 120 receives bid grants for accessing specified switch outputs, through specified crossbars. For example, the bid grant may state that the first channel assembler output (first switch input) has permission to access switch output n through the second crossbar. The grant arbiter 120 selects the least recently used available channels for the specified crossbars. The term "least recently used", as used herein, is defined below.

Figure 4:
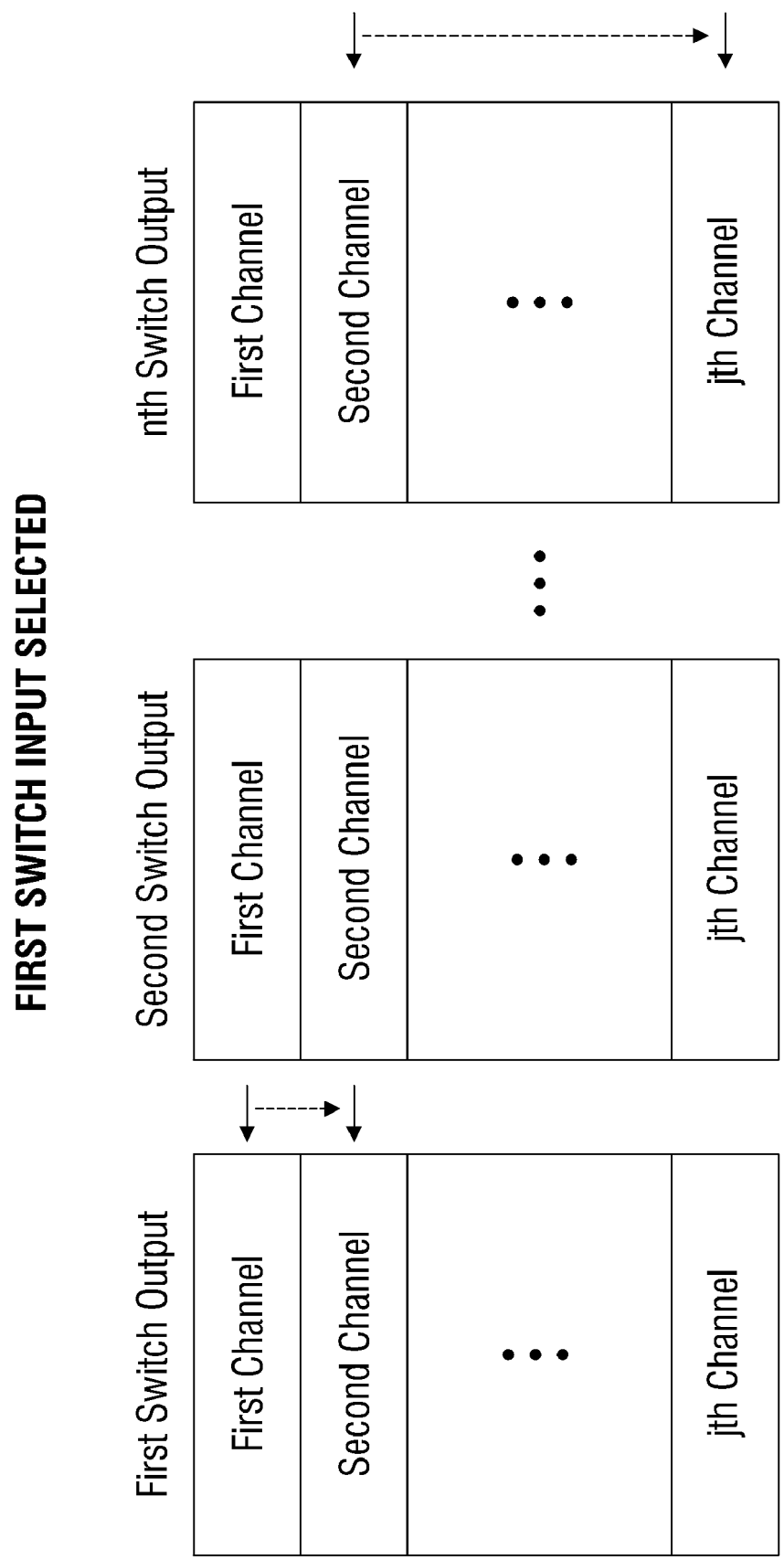
FIG. 4 illustrates ordered channel priority lists such as might be used by the grant arbiter to select least recently used channels.

FIG. 4 illustrates ordered channel priority lists such as might be used by the grant arbiter 120 to select the least recently used channel. The grant arbiter 120 includes a channel priority list for each specified switch output. The grant arbiter 120 selects the least recently used available channel in response to the channel priority list. In some aspects of the invention, available channels are selected in at least one grant cycle per decision cycle. Information is transferred thorough the switch and crossbars in units of a cell, one cell per decision cycle.

Alternately stated, the grant arbiter creates an ordered channel priority list for each specified switch output, and following the selection of a first channel, moves the first channel to the end of the list. The grant arbiter nominates the available channel closest to the top of the list in a subsequent decision cycle.

In one aspect of the system, the grant arbiter selects available channels in at least one grant cycle per decision cycle by selecting the highest priority available channel, for at least one specified switch output, in a first grant cycle. Then, the highest priority available channel for other specified switch outputs are selected in subsequent grant cycles. One or more channels may be selected each grant cycle. Optimally, the highest priority available channel for each specified switch output in the first grant cycle. In the event of contention for channels, a switch output priority system is established, and contention between specified switch outputs for a commonly selected channel is resolved in response to the priority system. The priority system can be a simple fixed order, such as the first switch output always has priority over the second switch output. Alternately, the priority system can be one that promotes greater fairness by giving the winner of previous contests a lower priority in subsequent contests.

As mentioned above, the grant arbiter 120 selects the least recently used channel for each specified switch output. More specifically, the grant arbiter 120 creates an ordered list of channels for each specified switch output. Following the selection of a first channel, the grant arbiter sets the pointer to a second channel, next in sequence to the first channel. Then, the grant arbiter 120 selects the available channel closest in succession to the second channel in a subsequent decision cycle. Alternately stated, the first channel is moved to the bottom of the list and in a subsequent decision cycle, the available channel closest to the top of the list is selected.

For example (FIG. 4), the grant arbiter 120 receives bid grants for accessing the first switch output and the nth switch output from the first switch input. The first switch output channel pointer is directed at the first channel. Therefore, the first channel is selected, if it is available. However, not every channel is available. An available channel includes an information packet addressed to that particular switch output, and it is possible for the information packet queues in a channel to be empty if data flow is light, or a destination (output address) unpopular. For this example, the first channel is devoid of information packets, so the first channel is unavailable. The second channel is available however, and it is selected by the first switch output. The channel pointer of the nth switch output priority list is also directed at the second channel, which is now unavailable. To avoid contention with the first switch output, the jth channel is selected.

It should be understood that a match between switch outputs and channels cannot always be made in one, or even two grant cycles per decision cycle. It is a design decision to trade off the processing time associated with additional grant cycles against the increased information throughput resulting from more channel/switch output matches.

Returning to FIG. 2, the system 100 further comprises a timer 250 having an output on line 252 to supply a decision cycle signal including at least one grant cycle. The grant arbiter 120 selects available channels for specified switch outputs every decision cycle. It should be understood that in some aspects of the invention that the information packets include more than one cell, so that the information packet cannot be completely transferred in one decision cycle. In this case, the link between the channel assembler output and switch output, through the specified crossbar, remains locked. As long as the link is locked, no bid grant determinations are made with respect to that link. Thus, if the second channel of the first channel assembler output was already locked in a link to the second output of the switch, the second channel would not be available when the first channel assembler output receives a bid grant to access the second output of the switch through another crossbar.

Figure 5:
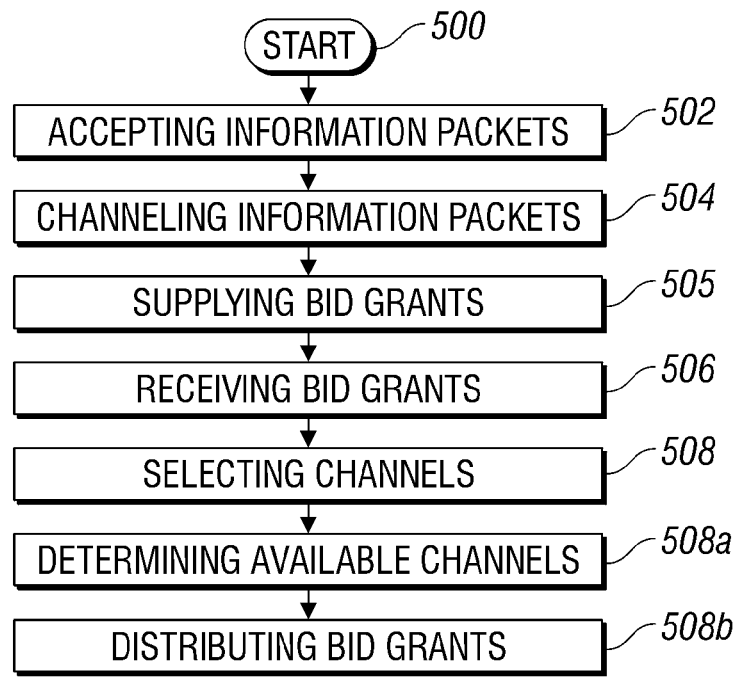
FIG. 5 is a flowchart depicting a method for distributing bid grants to access switch outputs.

FIG. 5 is a flowchart depicting a method for distributing bid grants to access switch outputs. Although the method (and the methods described below) is depicted as a series of numbered steps for clarity, no order should be inferred unless explicitly stated. The method begins with Step 500. Step 502 accepts information packets addressing a plurality of switch outputs at each switch input. Step 504 channels the information packets into a plurality of channels. Step 506, in response to bid submissions from the switch inputs, receives bid grants accessing switch outputs at selected switch inputs, for selected switch inputs. Step 508, for selected switch inputs, selects channels to accept the bid grants.

In some aspects of the invention, selecting channels to accept the bid grants in Step 508 includes sub-steps. Step 508a, for each selected switch input, determines the available channels having information packets addressed to the bid grant switch outputs. Step 508b distributes bid grants in response to the available channels.

Step 505 supplies up to a first plurality of bid grants accessing each switch output, for distribution among available channels in selected switch inputs. Receiving bid grants accessing switch outputs in Step 506 includes selected switch inputs receiving up to a first plurality of bid grants accessing each switch output.

Figure 6:
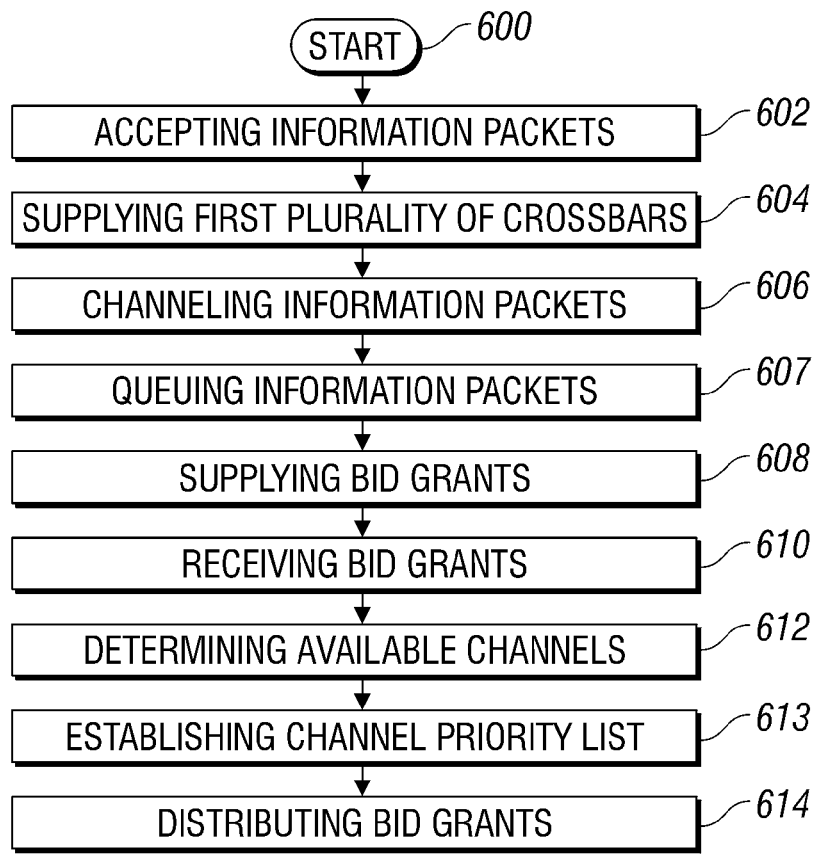
FIG. 6 is a flowchart illustrating additional details to the method of FIG. 5.

FIG. 6 is a flowchart further illustrating additional details to the method of FIG. 5. The method begins with Step 600. Step 602, at each of a second plurality of switch inputs, accepts information packets addressing a second plurality of switch outputs. Step 604 supplies a first plurality of switch crossbars, each including a plurality of parallel routed switch inputs and a plurality of parallel routed switch outputs to transfer information packets to switch outputs. Step 606 channels the information packets into a third plurality of channels. Step 608, in response to bid submissions from the switch inputs, supplies up to a first plurality of bid grants accessing each switch output, for distribution among available channels in selected switch inputs. Step 610 receives bid grants accessing switch outputs at selected switch inputs. Step 612, for each selected switch input, determines the available channels having information packet addressed to the bid grant switch outputs. Step 614 distributes bid grants in response to the available channels, where selected switch inputs receive up to a first plurality of bid grants accessing each switch output.

In some aspects of the invention, supplying up to a first plurality of bid grants accessing each switch output in Step 608 includes supplying a bid grant for each crossbar, to access each output address.

Step 607, in each channel, queues information packets by switch output, in up to a second plurality of queues per channel.

In some aspects of the invention, receiving bid grants accessing switch outputs in Step 610 includes the selected switch inputs receiving bid grants accessing specified switch outputs, through specified crossbars. Distributing bid grants in response to the available channels in Step 614 includes selecting least recently used available channels for the specified switch outputs.

Step 613 establishes an ordered channel priority list for each specified switch output. Selecting the least recently used available channels for the specified switch outputs in Step 614 includes selecting the least recently used available channel in response to the ordered channel priority list.

Figure 7:
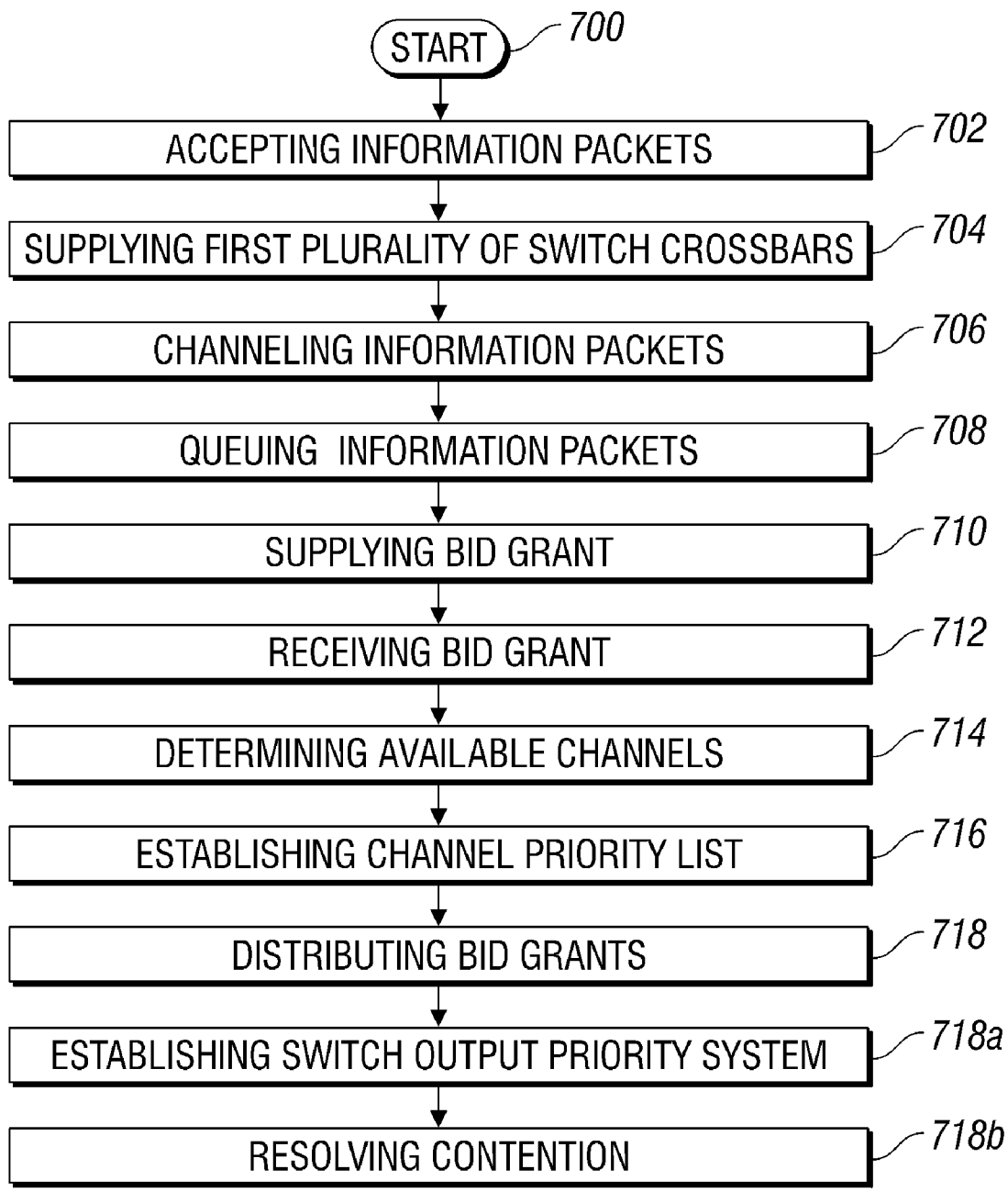
FIG. 7 is a flowchart illustrating additional details of the method of FIG. 6.

FIG. 7 is a flowchart illustrating additional details to the method of FIG. 6. The method begins with Step 700. Step 702, at each of a second plurality of switch inputs, accepts information packets addressing a second plurality of switch outputs. Step 704 supplies a first plurality of switch crossbars, each including a plurality of parallel routed switch inputs and a plurality of parallel routed switch outputs to transfer information packets to switch outputs. Step 706 channels the information packets into a first plurality of channels. Step 708, in each channel, queues information packets by switch output, in up to a second plurality of queues per channel. Step 710 supplies up to one bid grant for each crossbar accessing each switch output, for distribution among available channels in selected switch inputs. Step 712, for selected switch inputs, receives bid grants accessing specified switch outputs, through specified crossbars. Step 714, for each selected switch input, determines available channels having information packets addressed to the bid grant switch outputs. Step 716 establishes an ordered channel priority list for each specified switch output. Step 718 distributes bid grants in response to the available channels, where least recently used available channels are selected for the specified switch outputs in response to the channel priority list in at least one grant cycle per decision cycle.

In some aspects, distributing bid grants in response to the available channels in at least one grant cycle per decision cycle in Step 718 includes, for at least one specified switch output, selecting the highest priority available channel in a first grant cycle. Then, other (for example, the second and third switch outputs) specified switch outputs select the highest priority available channel in subsequent grant cycles. Optimally, each specified switch output selecting the highest priority available channel in the first grant cycle.

In some aspects, distributing bid grants in response to the available channels in at least one grant cycle per decision cycle includes substeps. Step 718a establishes a switch output priority system. Step 718b resolves contention between specified switch outputs for a commonly selected channel in response to the priority system.

In some aspects, establishing an ordered channel priority list for each specified switch output in Step 716 includes, following the selection of a first channel, moving the first channel to the end of the priority list. Then, selecting the available channel closest in succession to the second channel in a subsequent decision cycle.

Step 701 (not shown) establishes a decision cycle including at least one grant cycle. Distributing bid grants in response to the available channels in Step 718 includes selecting available channels for specified switch outputs every decision cycle.

A system and method have been provided for efficiently distributing switch output access bid grants, through multiple crossbars, between switch input channels. Examples have been given using a single output address queue for a single input. However, the invention is applicable to simultaneous bid grants for a plurality of output address queues, in a plurality of switch inputs. An ordered channel priority list system has been disclosed to implement to the least recently used matching scenario between channels and switch outputs. However, the present invention is not limited to just the priority list system. Other selection criteria could be used to choose between competing channels. For example, the selection criteria can be made on an analysis of the history of several previous choices. Other variations and embodiments of the invention will occur to those skilled in the art.

We claim:

1. A method for distributing bid grants to access switch outputs in the switching of information, the method comprising:

at each switch input, accepting information packets addressing a plurality of switch outputs;

channeling the information packets into a plurality of channels;

in response to bid submissions for selected switch inputs, receiving bid grants accessing switch outputs; and, for each selected switch input, selecting channels to accept the bid grants as follows:

for each selected switch input, determining the available channels having information packets addressed to the bid grant switch outputs; and, distributing bid grants in response to the available channels.

2. The method of claim 1 further comprising:

supplying up to a first plurality of bid grants accessing each switch output, for distribution among available channels in selected switch inputs; and, wherein receiving bid grants accessing switch outputs includes the selected switch inputs receiving up to a first plurality of bid grants accessing each switch output.

3. A method for distributing bid grants to access switch outputs in the switching of information, the method comprising:

for each of a second plurality of switch inputs, accepting information packets addressing a second plurality of switch outputs;

supplying a first plurality of switch crossbars, each including a plurality of parallel routed switch inputs and a plurality of parallel routed switch outputs to transfer information packets to switch outputs;

channeling the information packets into a third plurality of channels;

in response to bid submission for selected switch inputs, supplying up to a first plurality of bid grants accessing each switch output, for distribution among available channels;

for selected switch inputs, receiving bid grants accessing switch outputs;

for each selected switch input, determining the available channels having information packet addressed to the bid grant switch outputs; and, distributing bid grants in response to the number of available channels, where selected switch inputs receive up to a first plurality of bid grants accessing each switch output.

4. The method of claim 3 wherein supplying up to a first plurality of bid grants accessing each switch output includes supplying a bid grant for each crossbar, to access each switch output.

5. The method of claim 4 further comprising:

in each channel, queuing information packets by output address, in up to a second plurality of queues per channel.

6. The method of claim 5 wherein receiving bid grants accessing switch outputs includes the selected switch inputs receiving bid grants accessing specified switch outputs, through specified crossbars; and, wherein distributing bid grants in response to the available channels includes selecting least recently used available channels for the specified switch outputs.

7. The method of claim 6 further comprising:

establishing an ordered channel priority list for each specified switch output; and, wherein selecting the least recently used available channels for the specified switch outputs includes selecting the least recently used available channel in response to the ordered channel priority list.

8. A method for distributing bid grants to access switch outputs in the switching of information, the method comprising:

at each of a second plurality of switch inputs, accepting information packets addressing a second plurality of switch outputs;

supplying a first plurality of switch crossbars, each including a plurality of parallel routed switch inputs and a plurality of parallel routed switch outputs to transfer information packets to switch outputs;

channeling the information packets into a third plurality of channels;

in each channel, queuing information packets by switch output, in up to a second plurality of queues per channel;

in response to bid submissions for selected switch inputs, supplying up to one bid grant for each crossbar accessing each switch output, for distribution among available channels;

for selected switch inputs, receiving bid grants accessing specified switch outputs, through specified crossbars;

for each selected switch input, determining available channels having information packets addressed to the bid grant switch outputs;

establishing an ordered channel priority list for each specified switch output; and, distributing bid grants in response to the available channels, where least recently used available channels are selected for the specified switch outputs in response to the channel priority list in at least one grant cycle per decision cycle.

9. The method of claim 8 wherein distributing bid grants in response to the available channels in at least one grant cycle per decision cycle includes, for at least one specified switch output, selecting the highest priority available channel in a first grant cycle.

10. The method of claim 9 wherein distributing bid grants in response to the available channels in at least one grant cycle per decision cycle includes each specified switch output selecting the highest priority available channel in a first grant cycle.

11. The method of claim 9 wherein distributing bid grants in response to the available channels in at least one grant cycle per decision cycle includes other specified switch outputs selecting the highest priority available channel in subsequent grant cycles.

12. The method of claim 9 wherein distributing bid grants in response to the available channels in at least one grant cycle per decision cycle includes:

establishing a switch output priority system; and, resolving contention between specified switch outputs for a commonly selected channel in response to the priority system.

13. The method of claim 9 wherein establishing an ordered channel priority list for each specified switch output includes:
following the selection of a first channel, moving the first channel to the end of the priority list; and,
selecting the available channel closest in succession to the second channel in a subsequent decision cycle.

14. The method of claim 13 further comprising:
establishing a decision cycle including at least one grant cycles; and,
wherein distributing bid grants in response to the available channels includes selecting available channels for specified switch outputs every decision cycle.

15. A system for distributing switch output access bid grants in the transfer of information across a switch, the system comprising:
a channel assembler having a plurality of inputs, where each input accepts information packets addressing a plurality of switch outputs, the channel assembler channeling the information packets received at each input into a plurality of channels, and supplying the channelized information packets at a plurality of outputs, the channel assembler also having a channel status output to communicate the contents of each channel; and,
a grant arbiter having an input connected to the channel arbiter channel status output and an input to receive bid grants accessing switch outputs for selected channel assembler outputs, the grant arbiter selecting channels to accept the bid grants in each selected channel assembler output by determining the number of available channels in each selected channel assembler output, with information Packet addresses matching the bid grant switch outputs, and distributing bid grants in response to the number of available channels.

16. The system of claim 15 wherein the grant arbiter accepts up to a first plurality of bid grants accessing each switch output for distribution across each of the channel assembler outputs.

17. The system of claim 16 further comprising:
a switch including a first plurality of crossbars, each with a plurality of parallel routed switch inputs and a plurality of parallel routed switch outputs to transfer information packets to switch outputs; and,
wherein the grant arbiter accepts a bid grant for each crossbar to access each switch output.

18. The system of claim 17 wherein the switch includes a second plurality of switch inputs and a second plurality of switch outputs; and,
wherein the channel assembler includes a second plurality of outputs, and wherein the channel assembler channels information packets into a third plurality of channels per output.

19. A system for distributing switch output access bid grants in the transfer of information across a switch, the system comprising:
a channel assembler having a second plurality of inputs, where each input accepts information packets addressing a second plurality of switch outputs, the channel assembler channeling the information packets received at each input into a third plurality of channels, queuing the information packets by switch output, and supplying the channelized information packets at a plurality of outputs, the channel assembler also having a channel status output to communicate the contents of each channel;
a switch including a first plurality of crossbars with a second plurality of parallel routed switch inputs and a second plurality of parallel routed switch outputs to transfer information packets to switch outputs; and,
a grant arbiter having an input connected to the channel arbiter channel status output and an input to receive bid grants accessing switch outputs for selected information inputs, the grant arbiter determining the number of available channels in each selected channel assembler output, with information packet addresses matching the bid grant switch outputs, and distributing up to one bid grant for each crossbar accessing each switch output.

20. The system of claim 19 wherein the grant arbiter receives bid grants for accessing specified switch outputs through specified crossbars, and wherein the grant arbiter selects the least recently used available channels for the specified switch outputs.

21. The system of claim 20 wherein the grant arbiter includes an ordered channel priority list for each specified switch output, and wherein the grant arbiter selects the least recently used available channel in response to the ordered channel priority lists.

22. The system of claim 21 wherein the grant arbiter selects available channels in at least one grant cycle per decision cycle.

23. The system of claim 22 wherein the grant arbiter selects available channels in at least one grant cycle per decision cycle by selecting the highest priority available channel, for at least one specified switch output, in a first grant cycle.

24. The system of claim 23 wherein the grant arbiter selects available channels in at least one grant cycle pre decision cycle by selecting the highest priority available channel for each specified switch output in a first grant cycle.

25. The system of claim 23 wherein the grant arbiter selects available channels in at least one grant cycle pre decision cycle by selecting the highest priority available channel for other specified switch outputs in subsequent grant cycles.

26. The system of claim 23 wherein the grant arbiter selects available channels in at least one grant cycle pre decision cycle by establishing a switch output priority system, and resolving contention between specified switch outputs for a commonly selected channel in response to the priority system.

27. The system of claim 23 wherein the grant arbiter creates an ordered channel priority list for each specified switch output, and following the acceptance of a first channel, moves the first channel to the end of the list; and,
wherein the grant arbiter nominates the available channel closest to the top of the list in a subsequent decision cycle.

28. The system of claim 27 further comprising:
a timer having an output to supply a decision cycle signal including at least one grant cycle; and,
wherein the grant arbiter selects available channels for specified switch outputs every decision cycle.

* * * * *